UNITED STATES PATENT OFFICE.

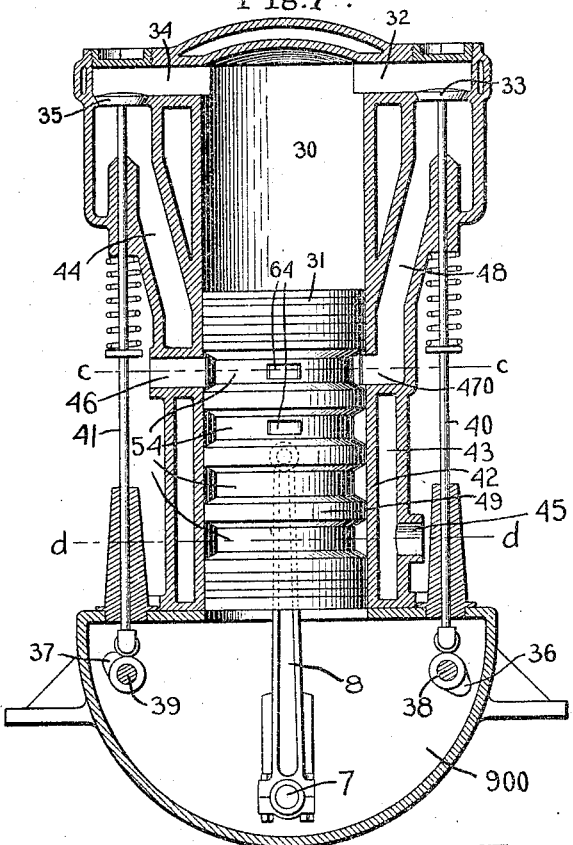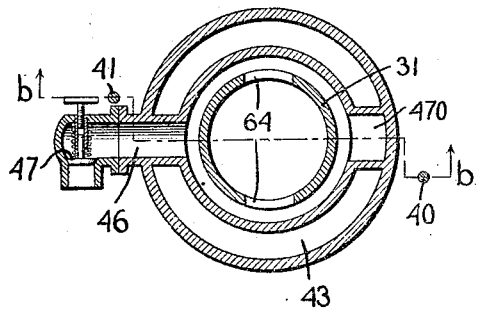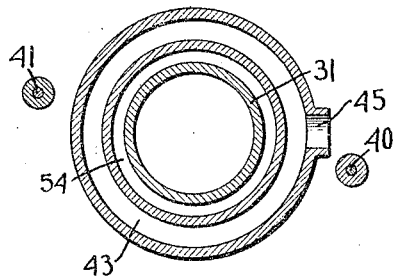

GEORGE H. HINCHLIFFE, OF BOSTON, MASSACHUSETTS.

INTERNAL-COMBUSTION ENGINE.

1,297,350.  Specification of Letters Patent.  Patented Mar. 18, 1919.

Application filed January 11, 1915. Serial No. 1,509.

*To all whom it may concern:*

Be it known that I, GEORGE H. HINCHLIFFE, a citizen of the United States, residing at Boston, county of Suffolk, State of Massachusetts, have invented an Improvement in Internal-Combustion Engines, of which the following description, in connection with the accompanying drawing, is a specification, like characters on the drawing representing like parts.

This invention relates to internal combustion engines and has for its principal object to provide a novel engine having provision for increasing the efficiency thereof. I accomplish this object herein by providing means whereby the heat in the exhaust gases which is usually wasted is utilized to heat the incoming charge before it is delivered to the cylinder. My invention is also of such a nature that the heating arrangement by which the heating of the incoming charge is effected constitutes a muffler for the exhaust gases. The invention therefore involves an engine which comprises a combined muffler and heater.

In order to give an understanding of my invention I have illustrated in the drawings some selected embodiments thereof which will now be described after which the novel features of the invention will be pointed out in the appended claims.

In the drawings:

Figure 1 shows in vertical section, on line $b$—$b$ of Fig. 2, an engine embodying my invention;

Fig. 2 is a section on the line $c$—$c$, Fig. 1;

Fig. 3 is a section on the line $d$—$d$ Fig. 2.

In the drawings I have illustrated at 30 the cylinder of an internal combustion engine in which operates the usual piston 31, that is connected to the crank 7 by means of the usual connecting rod 8. This crank 7 is shown as operating in a closed crank case 900, which may have any suitable or usual construction. The piston is provided with an extension which is formed with chambers into which the incoming charge of fuel supply is admitted, and in which it is retained during the working stroke of the piston, said fuel charge being delivered from the chambers to the working end of the cylinder during the suction stroke of the piston. The construction is such that the charge will be heated by the exhaust gases while it is retained in the piston chamber or piston chambers. The cylinder 30 is provided with an inlet port 32 controlled by an inlet valve 33, and is also provided with an outlet or exhaust port 34 controlled by an exhaust valve 35. These valves are provided with valve stems 40, 41 and are actuated by cams 36 and 37 on cam shafts 38 and 39, respectively, said cam shafts being properly geared to the crank shaft 7, as usual in internal combustion engines. The cylinder 30 is provided with an extension 42 which is surrounded by a chamber 43 communicating with the exhaust port 34 through a duct 44, said chamber 43 having formed therein an exhaust port 45 through which the gases are finally exhausted. The engine is also provided with an inlet port 46 which is herein shown as controlled by a spring-pressed valve 47 and which leads to the lower end of the cylinder, the latter having a port 470 communicating with a duct 48 leading to the inlet port 32. The piston 31 is provided with a piston extension 49 which is provided with chambers that are brought into communication with the inlet port 46 and port 470 as the piston reciprocates. The piston extension herein shown is provided with a plurality of such chambers, they being in the form of annular grooves or spaces 54 surrounding and formed in the exterior of the piston extension 49. As the piston reciprocates these chambers are successively brought into communication with the ports 46 and 470, as will be obvious.

In the operation of a four-cycle engine, one downward stroke of the piston is a suction stroke which draws a charge of fuel supply into the working end of the cylinder; the next upward stroke is a compression stroke for compressing the charge, at the end of which stroke the charge is ignited; the next downward stroke is the working stroke; and the next upward stroke is the exhaust stroke. During the suction stroke the inlet valve 33 will be opened, and during the exhaust stroke the exhaust valve 35 will be opened. Assuming that the piston 31 is at the upper end of its stroke and is about to make the downward suction stroke, it will be observed that as the piston moves downwardly the various annular chambers 54 will be brought successively into communication with the ports 46 and 470. These chambers 54 are filled with the gaseous mixture constituting the fuel supply, and as each chamber comes into communication with the ports 46, 470, the suction in the cylinder 30 will draw from each chamber 54 some or all of the charge it contains, and the gas thus withdrawn will be replaced by fresh gas entering the inlet port 46. Hence during the suction stroke the operation is the transfer from the chambers 54 into the cylinder 30 of some or all of the gas which these chambers 54 contain, and the replacing of such transferred gas with fresh gaseous material. During the compression stroke, the working stroke and the exhaust stroke of the piston such fresh gaseous material is simply retained in the chambers 54, but during the next suction stroke it is transferred through the duct 48 into the cylinder 30 and its place is taken by fresh quantities of gas admitted through the port 46. The exhaust gases are delivered through the duct 44 into the annular chamber 43 and thence through the exhaust port 45. The presence of these exhaust gases in the chamber 43 keeps the cylinder extension 42 heated. During the back stroke of the piston the gas in the chambers 54 is brought into direct contact with the heated walls of the working end of the cylinder and thus becomes heated thereby. During each forward stroke of the piston the gas in said chambers 54 is brought into contact with the heated walls of the cylinder extension. As a result the gaseous fuel supply in the chambers 54 becomes considerably heated before it is delivered to the working end of the cylinder. The piston extension will preferably be made hollow and it is provided with ports 64 which permit the gas to enter the interior of the piston. In all embodiments of my invention the exhaust gases are made use of for heating the incoming charges of fuel supply before it is delivered to the working end of the cylinder, and by this means it is possible to use successfully kerosene or still heavier oils as fuel. The heating of the incoming charge assists very materially in vaporizing the oil and thus permits the use of an oil which is much less easily vaporized than gasolene.

I claim:

1. In an internal combustion engine, the combination with a cylinder having inlet and exhaust ports, of a piston in the cylinder provided on its exterior with chambers, means to deliver the combustible fuel to said chambers whereby on the back stroke of the piston the fuel retained in said chambers is carried into direct contact with the heated walls of the working end of the cylinder and thereby heated, and means providing for the transfer of the heated fuel from the piston chambers to the inlet port of the cylinder.

2. In an internal combustion engine, the combination with a cylinder having inlet and exhaust ports, of a chamber surrounding the lower end of the cylinder and communicating with the exhaust port, said chamber having an outlet port whereby the exhaust gases from the cylinder are delivered into and pass through said chamber thereby heating the lower end of the cylinder, a piston in the cylinder provided with peripheral pockets or chambers, means to deliver the combustible fuel to said pockets or chambers whereby on the back stroke of the piston the fuel contained in said chambers is carried into contact with the heated walls of the working end of the cylinder and on the forward stroke said fuel is carried by the piston into contact with the heated walls of the lower end of the cylinder, and means providing for the transfer of the fuel from the chambers of the pistons to the inlet port of the cylinder.

3. In an internal combustion engine, the combination with a cylinder having inlet and exhaust ports, of a piston operating in the cylinder and provided with a chamber on its exterior face, said cylinder having a port which communicates with said chamber as the piston reciprocates, means constituting a communication between said port and the inlet port to the cylinder, and means to deliver hydrocarbon fuel to said chamber whereby on each back stroke of the piston the fuel contained in said chamber is carried by the piston into contact with the heated walls of the working end of the cylinder and is thus heated before it is delivered to the inlet port.

4. In an internal combustion engine, the combination with a cylinder having an inlet port, of a piston in the cylinder, and means whereby on the back stroke of the piston fuel mixture is carried thereby into contact with the heated walls of the working end of the cylinder, and means providing for delivering said fuel mixture to the inlet port of the cylinder.

5. In an internal combustion engine, the combination with a cylinder having an inlet port, of a piston in the cylinder, means whereby on the back stroke of the piston fuel mixture is carried thereby into direct contact with the heated walls of the working end of the cylinder, and means providing for delivering said fuel mixture to the inlet port of the cylinder during a forward stroke of the piston.

6. In an internal combustion engine, the combination with a cylinder having inlet and exhaust ports, of a piston in the cylinder provided on its exterior with chambers, means to deliver the combustible fuel to said chambers whereby on the back stroke of the piston the fuel in said chambers is carried into direct contact with the heated walls of the working end of the cylinder and thereby heated, and means providing for the transfer of the heated fuel from the chambers of the piston to the inlet port of the cylinder during a forward stroke of the piston.

In testimony whereof, I have signed my name to this specification, in the presence of two subscribing witnesses.

GEORGE H. HINCHLIFFE.

Witnesses:
LOUIS C. SMITH,
THOMAS J. DRUMMOND.

Copies of this patent may be obtained for five cents each, by addressing the "Commissioner of Patents, Washington, D. C."